(12) United States Patent
Kapusta et al.

(10) Patent No.: US 12,123,988 B2
(45) Date of Patent: Oct. 22, 2024

(54) HYBRID LASED/AIR COUPLED PET BLOCK DETECTOR

(71) Applicant: Siemens Medical Solutions USA, Inc., Malvern, PA (US)

(72) Inventors: Maciej Kapusta, Knoxville, TN (US); James L. Corbeil, Knoxville, TN (US); Johannes Breuer, Forchheim (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 320 days.

(21) Appl. No.: 17/597,781

(22) PCT Filed: Jun. 10, 2020

(86) PCT No.: PCT/US2020/070130
§ 371 (c)(1),
(2) Date: Jan. 24, 2022

(87) PCT Pub. No.: WO2021/056003
PCT Pub. Date: Mar. 25, 2021

(65) Prior Publication Data
US 2022/0236426 A1 Jul. 28, 2022

Related U.S. Application Data

(60) Provisional application No. 62/903,257, filed on Sep. 20, 2019.

(51) Int. Cl.
*G01T 1/164* (2006.01)
*G01T 1/20* (2006.01)
(Continued)

(52) U.S. Cl.
CPC .......... *G01T 1/1644* (2013.01); *G01T 1/2002* (2013.01); *G01T 1/20185* (2020.05); *G01T 1/248* (2013.01); *G01T 1/2985* (2013.01)

(58) Field of Classification Search
CPC ... G01T 1/1644; G01T 1/2002; G01T 1/2985; G01T 1/20; G01T 1/202
See application file for complete search history.

(56) References Cited

U.S. PATENT DOCUMENTS 5,258,145 A * 11/1993 Nelson ...................... G21K 4/00
313/469
7,408,164 B2   8/2008 Schmand et al.
(Continued)

FOREIGN PATENT DOCUMENTS

EP   2799911   11/2014
GB   2198620   6/1988
(Continued)

OTHER PUBLICATIONS

International Search Report for Corresponding PCT Application No. PCT/US2020/070130, dated Sep. 11, 2020.
(Continued)

*Primary Examiner* — David P Porta
*Assistant Examiner* — Casey Bryant

(57) ABSTRACT

Provided is a method of fabricating a detector array that includes preparing a plurality of slabs of an optical medium of an imaging device, forming a plurality of optical boundaries within at least one of the slabs of optical medium, where the plurality of optical boundaries defining a 1×N array of non-contiguous, independent light-redirecting regions within the at least one slab, arranging the plurality of slabs into a stack with a reflective layer defined between each adjacent slab and affixing the positions of the plurality of slabs with respect to each other. A detector array formed using the method is also provided.

24 Claims, 5 Drawing Sheets

(51) Int. Cl.
*G01T 1/24* (2006.01)
*G01T 1/29* (2006.01)

(56) References Cited

U.S. PATENT DOCUMENTS

| | | |
|---|---|---|
| 8,470,214 B2 | 6/2013 | Corbeil et al. |
| 9,709,684 B2 | 7/2017 | Kim |
| 2015/0028218 A1* | 1/2015 | Kataoka ............... G01T 1/2985 250/367 |
| 2015/0115162 A1* | 4/2015 | Tashima ............... A61B 6/037 250/363.03 |
| 2016/0170040 A1* | 6/2016 | Kim ..................... G01T 1/2002 250/366 |
| 2016/0170043 A1* | 6/2016 | Andreaco ............. G01T 1/2002 250/368 |
| 2016/0209517 A1 | 7/2016 | Cooke et al. |
| 2018/0100936 A1* | 4/2018 | Tonami ................. G01T 1/2006 |
| 2020/0025953 A1* | 1/2020 | Nishibe ............. H01L 27/14663 |
| 2022/0211334 A1* | 7/2022 | Furenlid ............... A61B 6/4258 |

FOREIGN PATENT DOCUMENTS

| | | |
|---|---|---|
| JP | S6375587 | 4/1988 |
| JP | 20091283339 | 6/2009 |
| JP | 2016031289 | 3/2016 |
| WO | 2004109870 | 12/2004 |
| WO | WO-2011042822 A2 * | 4/2011 ........... G01T 1/2002 |

OTHER PUBLICATIONS

Moriya, T., et al. "Development of PET detectors using monolithic scintillation crystals processed with sub-surface laser engraving technique." IEEE Transactions on Nuclear Science 57.5 (2010): 2455-2459.

* cited by examiner

HYBRID LASED/AIR COUPLED PET BLOCK DETECTOR

CROSS-REFERENCE TO RELATED APPLICATIONS

This application claims priority under 35 U.S.C. § 119(e) to United States Provisional Application No. 62/903,257, filed on Sep. 20, 2019, the entire contents of which are incorporated herein by reference.

FIELD

The present disclosure relates to a method for fabricating a detector array for use in imaging applications such as X-ray imaging, fluoroscopy, positron emission tomography (PET), single photon emission computed tomography (SPECT), computed tomography (CT), gamma camera and digital mammography systems.

BACKGROUND

Imaging is widely used in many applications, both medical and non-medical. In the field of imaging, it is well known that imaging devices incorporate a plurality of scintillator arrays for detecting radioactivity from various sources. When constructing scintillator arrays composed of discrete scintillator elements, often the scintillator elements are packed together with a reflective medium interposed between the individual elements creating photon boundaries. Conventionally, the reflective medium serves to direct the scintillation light along the scintillator element into a light guide to accurately determine the location at which the radiation impinges upon the detector elements. The reflective medium further serves to increase the light collection efficiency from each scintillator element as well as to minimize the cross-talk, or light transfer (transmission of light), from one scintillator element to an adjacent element. The reflective media include reflective powders, films, paints, and adhesives doped with reflective powders, or a combination of materials. Reflective paints and powders contain one or more pigments such as MgO, $BaSO_4$, and $TiO_2$. Regardless of the approach, the conventional method of fabricating radiation detector arrays is a time- and labor-intensive process, with product uniformity dependent upon the skill level of the workforce. With the current market trend of higher spatially-resolute systems containing an order of magnitude more number of pixels than current designs, these process effects are even more pronounced.

Detector arrays are commonly integrated with photomultiplier tubes (PMTs) or solid-state photodetectors such as silicon photomultipliers (SiPMs), avalanche photodiodes (APDs), PIN diodes, and charge-coupled devices (CCDs). The incident high-energy photons absorbed by the scintillating material are converted to lower energy scintillation photons, which may be guided to the photodetectors via one or more of the following: the scintillator itself, a light guide, and other established means of light distribution.

In the arrangement wherein a light guide and/or other established means is used, commonly the light guide is formed by creating slits of various depths in a suitable substrate. Once packed with a reflective media, the light guide becomes an effective method to channel light and to enhance the position information of the scintillator. In the arrangement wherein paint or reflective tape is used, the paint or reflective tape is applied directly to the scintillators, achieving similar results. The height and placement of the applied reflective material varies according to design.

Conventionally, scintillator arrays have been formed from polished or unpolished crystals that are either: hand-wrapped in reflective PTFE tape and bundled together; glued together using a white pigment such as $BaSO_4$ or $TiO_2$ mixed with an epoxy or RTV; or glued to a glass light guide with defined spacing and afterwards filled with reflective material as discussed above.

Another approach utilizes individual reflectors bonded to the sides of certain scintillator elements with the aid of a bonding agent. An array is formed by arranging the individual elements spatially such that the impingement of the high-energy photon is decoded accurately.

SUMMARY

Provided herein is a method for fabrication of an optically-segmented detector array, such as a scintillator array. The method comprises: preparing a plurality of slabs of an optical medium of an imaging device; forming a plurality of optical boundaries within at least one of the slabs of optical medium, wherein the plurality of optical boundaries defining a 1×N array of non-contiguous, independent light-redirecting regions within the at least one slab; arranging the plurality of slabs into a stack with a reflective layer defined between each adjacent slab; and affixing the positions of the plurality of slabs with respect to each other.

Provided is a detector array comprising: a plurality of slabs of an optical medium arranged in a stack, wherein at least one of the slabs comprising: a 1×N array of non-contiguous, independent light-redirecting regions defined by N−1 optical boundaries, wherein each optical boundary is formed by an array of non-contiguous, independent micro-voids; a reflective layer defined between two adjacent slabs of the detector array, the reflective layer functioning to reflect light from the non-contiguous, independent light-redirecting regions, such that no other reflective material is present between adjacent slabs; and a mechanism for maintaining a relative position of each of the slabs of the array with respect to each other.

Also provided is a detector assembly that includes the detector array of the present disclosure.

BRIEF DESCRIPTION OF THE DRAWINGS

The features of the embodiments described herein will be more fully disclosed in the following detailed description, which is to be considered together with the accompanying drawings wherein like numbers refer to like parts. All drawing figures are schematic and they are not intended to represent actual dimensions of the structures or relative ratios of their dimensions.

DETAILED DESCRIPTION

Figure 1:
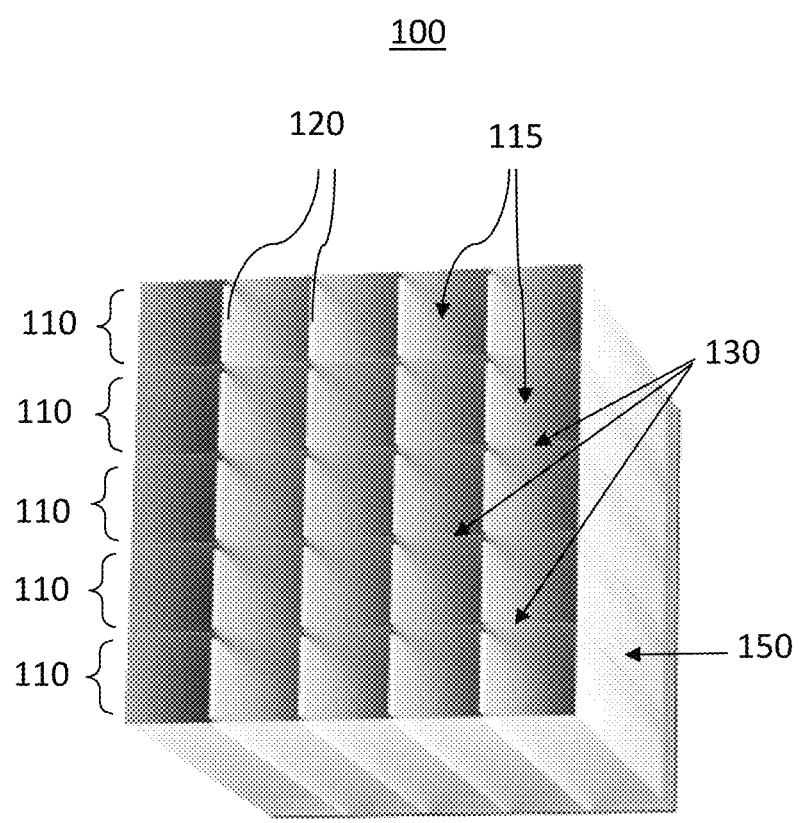
FIG. 1 is an illustration of a detector array according to an embodiment of the present disclosure.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 2:
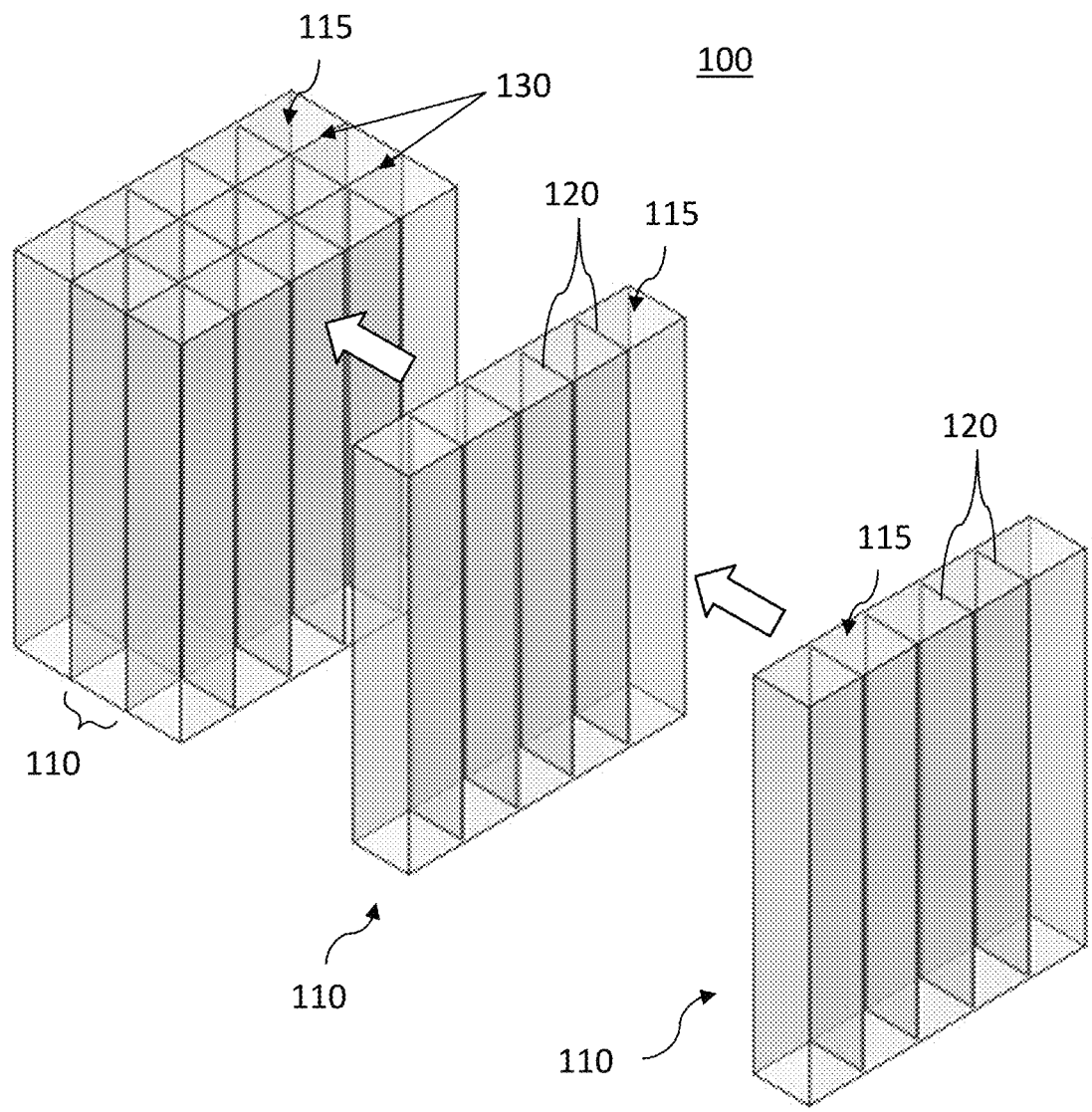
FIG. 2 is an illustration showing a partial exploded view of the detector array of FIG. 1.

Referring to FIGS. 1 and 2, a detector array 100 according to an embodiment is disclosed. The detector array 100 comprises a plurality of slabs 110 of optical medium arranged in a stack. At least one of the slabs 110 comprises a 1×N array of non-contiguous, independent light-redirecting regions 115 (i.e. detector elements) within the at least one slab 110. Each of the non-contiguous, independent light-redirecting regions 115 is defined by N−1 number of optical boundaries 120.

In some embodiments of the detector array 100, each of the plurality of slabs 110 comprises a 1×N array of non-contiguous, independent light-redirecting regions 115 within each of the slab 110. The stack of the slabs 110 would then form an M×N array of detector elements 115, where M represents the number of the slabs 110 of optical medium.

The slabs 110 are assembled into the stack so that there is reflective layer 130 defined between two adjacent slabs 110 of the array. The reflective layer 130 functions as a reflector and reflects light from within a detector element 115 to travel within the detector element 115.

In some embodiments, the reflective layer 130 can be an air-filled gap between the two adjacent slabs 110 and the detector array 100 has no other reflective material present between adjacent slabs 110. The width of the air-filled gap 130 depends on the surface roughness of the slabs 110. In preferred embodiments, the slabs 110 are configured to have a surface roughness so that when two slabs 110 are brought together, the width of the air-filled gap 130 is greater than 1× to 2× of the wavelength of the light generated by the optical medium of the detector element 115 so that evanescent waves (frustrated total internal reflection) are suppressed.

In some embodiments the reflective layer 130 comprises at least one of the following reflective materials: reflective powder, reflective film, reflective paint, and an adhesive doped with reflective powder, or a combination of the reflective materials The stacked slabs 110 are maintained in their relative positions in the detector array 100 with respect to each other by a mechanism such as a bonding agent or a retainer 150.

In some embodiments, the optical medium is scintillator crystal and the scintillator slabs 110 are stacked to form the detector array 100, which is a scintillator array. The air-filled gaps 130, in conjunction with the surface finish of the scintillator slab 110, define the light collection efficiency of the scintillator elements 115 as well as the amount of light sharing that occurs between the elements 115. The significant change in the index of refraction (IOF) from a detector element 115 and air increases the angle of total refraction. Based on the ratio IOF(scintillator)/IOF(air) and the surface finish of the scintillator slabs 110 the amount of scintillation light photons is tuned such that a controlled amount of photons are collimated down through a scintillator element 115 and a controlled amount are transmitted to neighboring scintillator elements 115. The optimal ratio is customized for each scintillator element 115 within the detector array 100 such that each element 115 in the detector array 100 is clearly identified. The ratio may be spatially variant.

Figure 3:
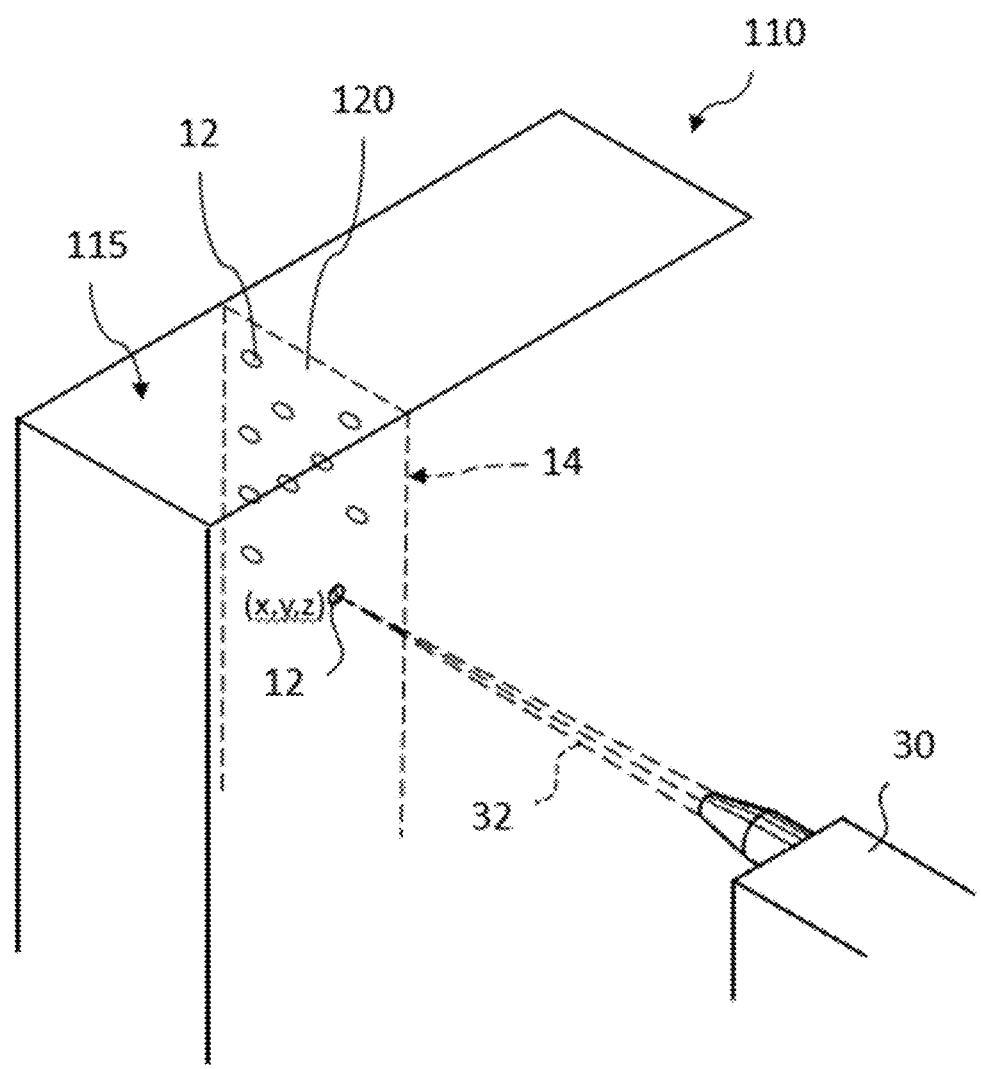
FIG. 3 is an illustration showing an array of non-contiguous, independent micro-voids that form the optical boundary between scintillator elements in each of the slabs that form the detector array of the present disclosure.

Referring to FIG. 3, each optical boundary 120 in the scintillator slab 110 is formed by an array of non-contiguous, independent micro-voids 12 formed in the optical medium. The plurality of micro-voids 12 is defined to collectively function to channel scintillation light through optically-segmented portions 115 of the scintillator. The micro-voids 12 are positioned in a spatial plane 14 in the optical medium to define the optical boundaries 120 of the optically-segmented portions 115 of the detector array 100. The micro-voids 12 can be disposed in varying sizes in a specific uniform pattern, or randomly placed. The micro-voids may be disposed in single or multiple layers, or may be randomly scattered within a given volume. The micro-voids can be disposed in planar, curvilinear, or other geometrically-arranged configurations on the spatial plane 14. To this extent, the optically-segmented portions of the scintillator can define various cross-sectional configurations other than square. For example, the optically-segmented portions can define triangular, trapezoidal, or hexagonal geometries. Alternatively, the optically-segmented portions can define a combination of configurations, such as octagons and squares.

The micro-voids are formed using a laser source 30. The laser source 30 is used to generate and focus a beam of light 32 into an optical medium at each selected location (x,y,z) in sequence. The laser source 30 yields a laser beam 32 of sufficient power to ablate the targeted optical medium at the focal point, resulting in a damage to the crystalline structure of the optical medium at that location which will be referred to herein as a micro-void 12. The micro-void causes photon that encounters it to scatter. The micro-voids are sometime referred to as micro-cracks in the industry.

As mentioned herein, the optical medium used for the detector array 100 can be a scintillator or a light-transmitting block, or light guide. The optical media is fabricated from a material that does not absorb in the wavelength of the laser. The intense energy collecting at the focal point of the laser beam creates a micro-void within the targeted optical media that extends outward in all directions from the point of origin. More details of the laser process for forming the micro-void can be found in U.S. Pat. No. 8,470,214, the contents of which are incorporated by reference herein.

Figure 4A:
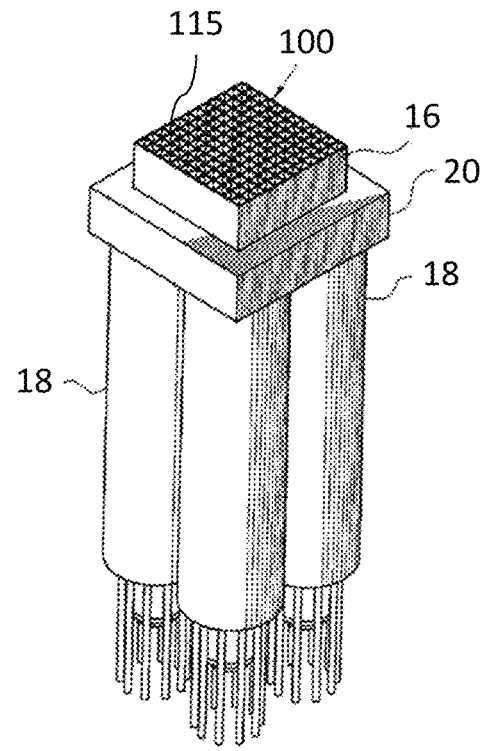
FIGS. 4A-4B are illustrations of examples of detector assembly according to some embodiments.

Illustrated in FIG. 4A is an example of a detector assembly 100A according to some embodiments. The detector assembly 100A comprises the detector array 100 and at least one photodetector 18. The detector array 100 is coupled to the at least one photodetector 18 and the array of scintillator elements 115 are optically coupled to the at least one photodetector 18. The at least one photodetector 18 can be selected from, but not limited to, PMTs, position sensitive PMTs, SiPMs, APDs, PIN diodes, CCDs, and other solid state detectors.

In this arrangement, the scintillator elements 115 disposed within the detector array 100 serve to detect an incident gamma ray and thereafter produce a light signal corresponding to the amount of energy deposited from the initial interaction between the gamma ray and the scintillator element 115. The detector array 100 serves to reflect and channel the light down the scintillator element 115 to the photodetector 18. The signal generated by the photodetector 18 is then post-processed and utilized in accordance with the purpose of the imaging device.

In some embodiments, a light guide 20 can be selectively placed between the detector array 100 and the receiving photodetectors 18 if necessary. The light guide 20 defines a selected configuration, such as being segmented or continuous. The light guide 20, when employed, is optimized depending on the choice of scintillator elements 115 and photodetectors 18.

In embodiments utilizing the light guide 20, the detector array 100 serves to reflect and channel the light generated within a scintillator element down the scintillator element 115 to the coupled light guide 20 and to the photodetector 18. The signal generated by the photodetector 18 is then post-processed and utilized in accordance with the purpose of the imaging device.

In the detector array 100 of the present disclosure, the relative positions of the individual detector elements 115 are maintained by maintaining the relative positions of the scintillator slabs 110 within the detector array 100 by the use of a retaining mechanism 16. In some embodiments, the retaining mechanism 16 can be a retainer that wraps around the outer perimeter of the detector array 100. The detector assembly 100A in FIG. 4A is illustrated with such retainer 16. Such retainer 16 can be fabricated from conventional materials such as shrink wrap, rubberized bands, tape or a combination of like materials may be used to enclose or hold the slabs 115 together in a tight, uniform fashion. Although illustrated in FIG. 4A as spanning the entire height of the detector array 100, the retainer 16 can in some applications include one or more retainers which span only a portion of the height of the detector array 100.

In other embodiments, the retaining mechanism 16 can be a bonding agent that is applied between the detector array 100 and the continuous light guide 20.

Figure 4B:
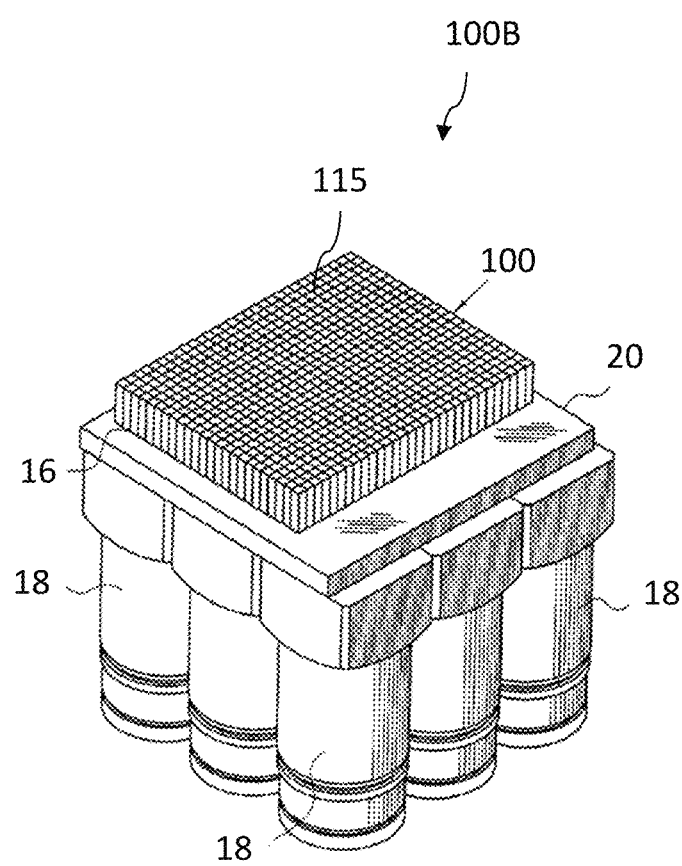

Illustrated in FIG. 4B is another example of a detector assembly 100B disposed above a continuous light guide 20. In this example, the relative positions of the individual scintillator elements 115 are maintained by a mechanism 16 that is a bonding agent applied between the detector array 100 and the continuous light guide 20. The continuous light guide 20 is disposed above an array of photodetectors 18, such as in a panel detector.

In some embodiments of the detector assembly 100A, 100B, the at least one photodetector 18 can be a PMT, a position sensitive PMT, an SiPM, an APD, a PIN diode, a CCD, or other type of solid state detector.

In the embodiments of the detector assembly 100A, 100B comprising a light guide 20 disposed between the detector array 100 and the at least one photodetector 18, the scintillator elements 115 are optically coupled to the at least one photodetector 18 via the light guide 20.

In some embodiments of the detector assembly 100A, 100B, the light guide 20 is configured to be continuous over a plurality of the array of scintillator elements 115 and a plurality of the at least one photodetector 18.

Figure 5:
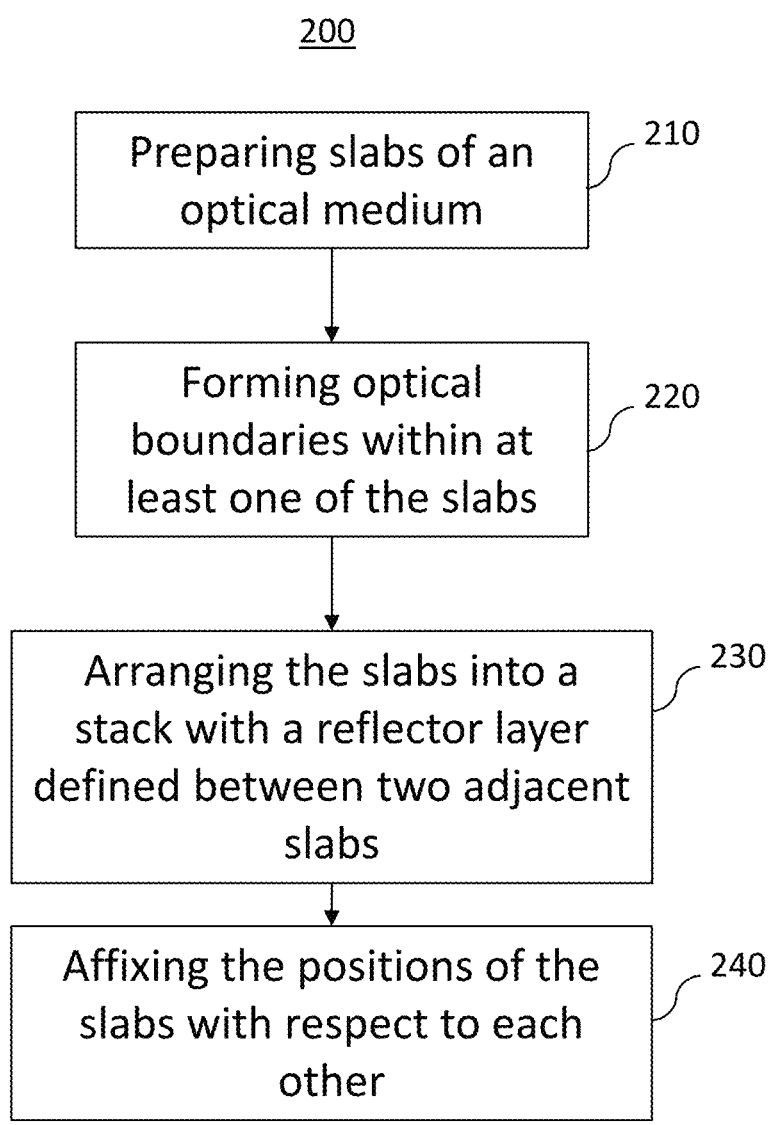
FIG. 5 is a flowchart illustrating a method for fabricating a detector array according to the present disclosure.

Referring to the flowchart 200 in FIG. 5, disclosed herein is a method for fabricating the detector array 100 of the present disclosure. The method comprises preparing a plurality of slabs 110 of an optical medium of an imaging device (step 210); forming a plurality of optical boundaries 120 within at least one of the slabs 110 of optical medium, wherein the plurality of optical boundaries 120 defining a 1×N array of non-contiguous, independent light-redirecting regions (i.e. detector elements) within the at least one of the slabs, where N represents the number of individual detector elements 115 (step 220); arranging the plurality of slabs into a stack with a reflective layer 130 defined between two adjacent slabs 110 (step 230); and affixing the positions of the plurality of slabs with respect to each other (step 240).

In some embodiments of the method, the reflective layer 130 can be an air-filled gap between each adjacent slab 110. In some embodiments, the reflective layer comprises at least one of the following reflective materials: reflective powder, reflective film, reflective paint, and an adhesive doped with reflective powder, or a combination of the reflective materials.

In some embodiments of the method, a plurality of optical boundaries 120 are formed within each of the slabs 110 of optical medium, whereby the stack of the plurality of slabs 110 form a M×N array of non-contiguous, independent light-redirecting regions in the detector array, wherein M represents the number of slabs 110.

In some embodiments of the method, affixing the positions of the plurality of slabs 110 comprise using a bonding agent 16 to attach each of the slabs 110 to at least one photodetector 18. In some embodiments, the detector assembly 100A, 100B comprises a light guide 20 and the method comprises affixing the positions of the plurality of slabs 110 comprises using a bonding agent 16 to attach each of the slabs 110 to the light guide 20, then attaching the light guide 20 to at least one photodetector 18.

In some embodiments of the method, forming the plurality of optical boundaries 120 comprise forming a plurality of non-contiguous, independent light-redirecting regions 12 in a spatial surface 14 within each of the slabs 110 by focusing a laser beam 32 at a selected wavelength at a focal point at a different selected location on the spatial surface 14, thereby changing the optical properties of the optical medium at the focal point.

In some embodiments of the detector array 100, the optical medium is a scintillator and wherein the optical boundary 120 defines a boundary between separate optically-segmented resolution elements 115 of the scintillator.

In some embodiments of the detector array 100, the optical medium is a light-transmitting object and wherein the optical boundary 120 defines a portion of a light guide within the light-transmitting object.

In some embodiments of the detector array 100, the plurality of optically-segmented resolution elements are rectilinear in shape.

In some embodiments of the detector array 100, the spatial surface 14 is curvilinear.

It will be understood that the foregoing description is of exemplary embodiments of this invention, and that the invention is not limited to the specific forms shown. Modifications may be made in the design and arrangement of the elements without departing from the scope of the invention.

We claim:

1. A method of fabricating a detector array of elongated detector elements, the method comprising:
preparing a plurality of slabs of an optical medium of an imaging device;
forming a plurality of optical boundaries within at least one of the slabs of optical medium by focusing a laser beam at a selected wavelength at a focal point at a different selected location on a spatial surface within the at least one of the slabs, thereby changing the optical medium's optical properties at the focal point and forming an array of non-contiguous, independent micro-voids that form the plurality of optical boundaries within the at least one of the slabs, wherein the plurality of optical boundaries define a 1×N array of non-contiguous, independent light-redirecting elongated detector elements within the at least one of the slabs, wherein the detector array has a length and each of the elongated detector elements extend the length of the detector array;

arranging the plurality of slabs into a stack with a reflective layer defined between each adjacent slab, wherein the plurality of optical boundaries within the at least one of the slabs are oriented parallel to the direction of the detector elements' elongation, wherein the reflective layer is an air-filled gap between each adjacent slab and the width of the air-filled gap is greater than 1× to 2× of the wavelength of the light generated by the optical medium of the slabs so that evanescent waves are suppressed; and affixing the positions of the plurality of slabs with respect to each other.

2. The method of claim 1, wherein the reflective layer comprises at least one of the following reflective materials: reflective powder, reflective film, reflective paint, and an adhesive doped with reflective powder, or a combination of the reflective materials.

3. The method of claim 1, wherein the plurality of optical boundaries are formed within each of the slabs of optical medium, whereby the stack of the plurality of slabs form a M×N array of non-contiguous, independent light-redirecting regions in the detector array, wherein M represents the number of slabs.

4. The method of claim 1, wherein affixing the positions of the plurality of slabs comprises using a bonding agent to attach each of the slabs to at least one photodetector.

5. The method of claim 1, wherein affixing the positions of the plurality of slabs comprises using a bonding agent to attach each of the slabs to a light guide, then attaching the light guide to at least one photodetector.

6. The method of claim 1, wherein the optical medium is a scintillator and wherein the optical boundary defines a boundary between separate optically-segmented resolution elements of the scintillator.

7. The method of claim 6, wherein the plurality of optically-segmented resolution elements are rectilinear.

8. The method of claim 1, wherein the optical medium is a light-transmitting object and wherein the optical boundary defines a portion of a light guide within the light-transmitting object.

9. The method of claim 1, wherein the spatial surface is curvilinear.

10. A detector array of elongated detector elements comprising:
a plurality of slabs of an optical medium arranged in a stack, wherein at least one of the plurality of slabs comprising:
a 1×N array of non-contiguous, independent light-redirecting elongated detector elements within the at least one of the plurality of slabs, wherein the independent light-redirecting elongated detector elements are defined by a plurality of optical boundaries, wherein each optical boundary is an array of non-contiguous, independent micro-voids that are formed by focusing a laser beam of a selected wavelength at a focal point at different selected locations on a spatial surface within the at least one of the plurality of slabs, wherein the plurality of optical boundaries within the at least one of the slabs are oriented parallel to the direction of the detector elements' elongation;
a reflective layer formed of an air-filled gap between each adjacent slab and the air-filled gap has a width greater than 1× to 2× of the wavelength of the light generated by the optical medium of the slabs so that evanescent waves are suppressed, the reflective layer functioning to reflect light from the non-contiguous, independent light-redirecting regions, such that no other reflective material is present between adjacent slabs; and
a retainer or a bonding agent that maintains relative position of each of the slabs of the array with respect to each other.

11. The detector array of claim 10, wherein the stack of the slabs form an M×N array of the non-contiguous, independent light-redirecting regions, wherein M represents the number of the slabs.

12. The detector array of claim 10, wherein the reflective layer comprises at least one of the following reflective materials: reflective powder, reflective film, reflective paint, and an adhesive doped with reflective powder, or a combination of the reflective materials.

13. The detector array of claim 10, wherein the optical medium is a scintillator, the non-contiguous, independent light-redirecting regions are scintillator elements, and the detector array is a scintillator array.

14. The detector array of claim 10, wherein the non-contiguous, independent light-redirecting regions are rectilinear in shape.

15. A detector assembly comprising:
a detector array of elongated scintillator elements comprising:
a plurality of scintillator slabs arranged in a stack, wherein at least one scintillator slab comprising:
a 1×N array of elongated scintillator elements within the at least one scintillator slab defined by N–1 optical boundaries, wherein each optical boundary is an array of non-contiguous, independent micro-voids, wherein the optical boundaries are oriented parallel to the direction of the scintillator elements' elongation;
a reflective layer formed of an air-filled gap between each adjacent scintillator slab and the air-filled gap has a width greater than 1× to 2× of the wavelength of the light generated by the optical medium of the slabs so that evanescent waves are suppressed, the reflective layer functioning to reflect light from scintillator elements, such that no other reflective material is present between adjacent scintillator slabs; and
a retainer or a bonding agent that maintains relative position of each of the scintillator slabs of the array with respect to each other.

16. The detector assembly of claim 15, wherein each scintillator slab comprises a 1×N array of non-contiguous, independent light-redirecting regions defined by N–1 optical boundaries, wherein each optical boundary is formed by an array of non-contiguous, independent micro-voids;
wherein the stack of the scintillator slabs form an M×N array of the non-contiguous, independent light-redirecting regions, wherein M represents the number of the slabs.

17. The detector assembly of claim 15, wherein the reflective layer comprises at least one of the following reflective materials: reflective powder, reflective film, reflective paint, and an adhesive doped with reflective powder, or a combination of the reflective materials.

18. The detector assembly of claim 15, further comprising at least one photodetector and the array of scintillator elements being coupled to the at least one photodetector.

19. The detector assembly of claim 18, wherein the mechanism for maintaining a relative position of each of the scintillator slabs with respect to each other comprises a bonding agent for bonding the detector array to the at least one photodetector.

20. The detector assembly of claim 18, wherein the at least one photodetector is a photomultiplier tube, a position sensitive photomultiplier tube, a silicon photomultiplier, an avalanche photodiode, a pin diode, a CCD, or a solid state detector.

21. The detector assembly of claim 20, wherein the mechanism for maintaining a relative position of each of the scintillator slabs with respect to each other comprises a bonding agent for bonding the stack of scintillator slabs to the at least one photodetector.

22. The detector assembly of claim 18, further comprising a light guide disposed between the array of scintillator elements and the at least one photodetector, wherein the scintillator elements being optically coupled to the at least one photodetector via the light guide.

23. The detector assembly of claim 22, wherein the light guide is configured to be continuous over a plurality of the array of scintillator elements and a plurality of the at least one photodetector.

24. The detector assembly of claim 15, wherein the mechanism for maintaining a relative position of each of the scintillator slabs with respect to each other comprises a retainer that wraps around outer perimeter of the detector array.

\* \* \* \* \*